US006071645A

United States Patent [19]
Biensan et al.

[11] Patent Number: 6,071,645
[45] Date of Patent: *Jun. 6, 2000

[54] LITHIUM ELECTRODE FOR A RECHARGEABLE ELECTROCHEMICAL CELL

[75] Inventors: Philippe Biensan, Epinay sur Orge; Damien Gallet, Clichy sous Bois; Bernard Simon, Issy les Moulineaux, all of France

[73] Assignee: SAFT, Romainville, France

[*] Notice: This patent issued on a continued prosecution application filed under 37 CFR 1.53(d), and is subject to the twenty year patent term provisions of 35 U.S.C. 154(a)(2).

[21] Appl. No.: 08/723,350

[22] Filed: Sep. 30, 1996

[30] Foreign Application Priority Data

Jul. 12, 1996 [FR] France ................................. 96 08752

[51] Int. Cl.⁷ .............................. H01M 4/40; H01M 4/32
[52] U.S. Cl. ................. 429/223; 429/231.95; 429/231.9
[58] Field of Search ...................................... 429/218, 221, 429/219, 220, 222, 223, 228, 224, 144

[56] References Cited

U.S. PATENT DOCUMENTS 5,316,877  5/1994  Thackeray et al. ...................... 429/197
5,506,077  4/1996  Koksbang et al. ....................... 429/224

FOREIGN PATENT DOCUMENTS

| 0581290A1 | 2/1994 | European Pat. Off. . |
| 0651450A1 | 5/1995 | European Pat. Off. . |
| 712172 A2 | 5/1996 | European Pat. Off. ......... H01M 4/48 |
| 0744780A1 | 11/1996 | European Pat. Off. . |
| 2270195A | 3/1994 | United Kingdom . |
| WO9429915 | 12/1994 | WIPO . |

*Primary Examiner*—Maria Nuzzolillo
*Assistant Examiner*—Mark Ruthkosky
*Attorney, Agent, or Firm*—Sughrue, Mion, Zinn, Macpeak & Seas, PLLC

[57] ABSTRACT

The present invention concerns an electrode for a rechargeable lithium cell, containing an electro-chemically active material with general formula $$Li_xM_yA_mD_zO_t$$

where:

$0.8 \leq x \leq 1.2$   $0 \leq z \leq 0.3$   $1.8 \leq t \leq 4.2$ $(0.8 - m - z) \leq y \leq (2.2 - m - z)$   $0 < m \leq 0.3$ where M is at least one transition metal selected from nickel, cobalt, manganese, and iron, A is selected from magnesium and calcium, and D is at least one element selected from the elements of groups 4b to 5a of the periodic classification.

25 Claims, 1 Drawing Sheet

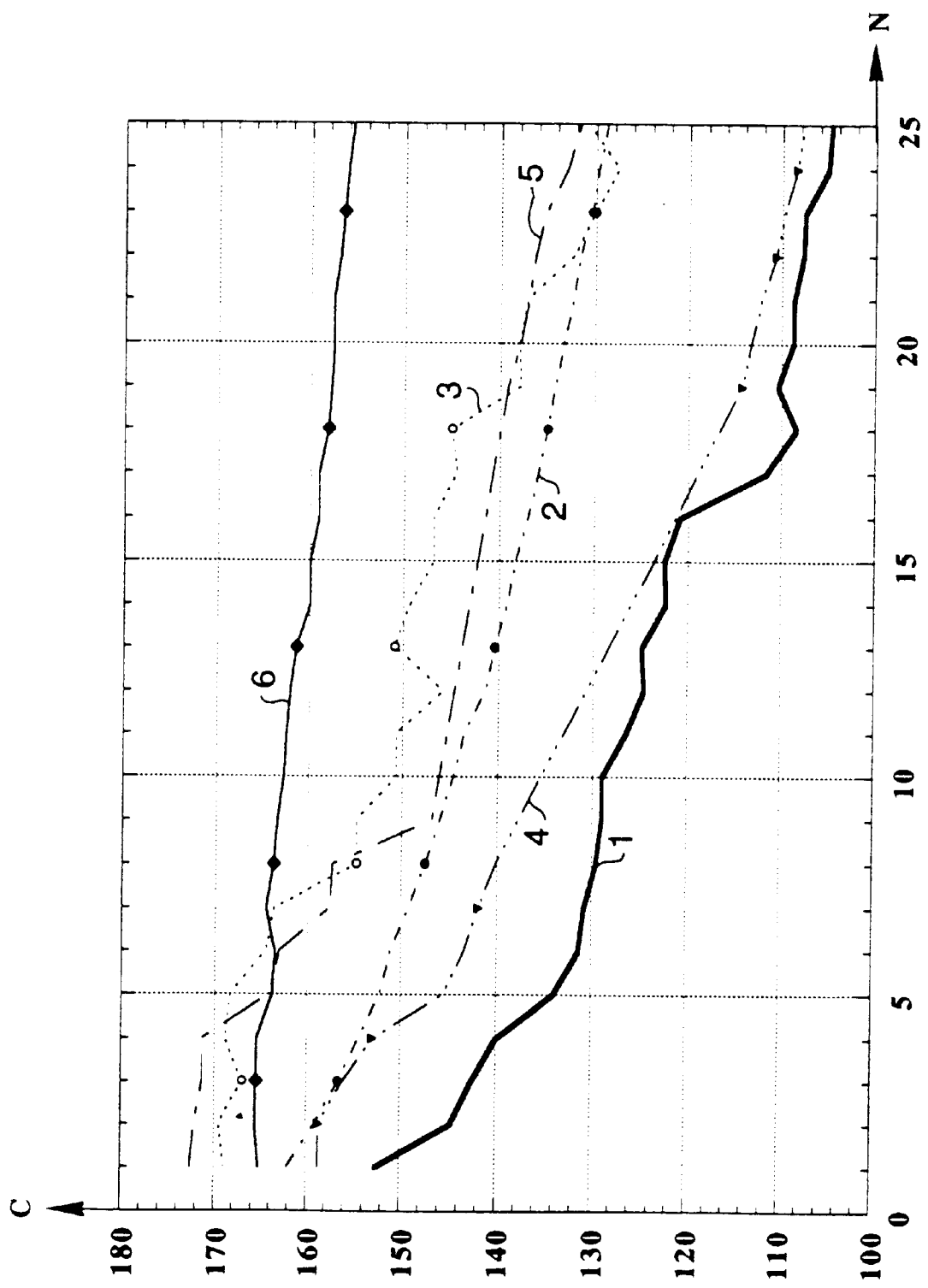

LITHIUM ELECTRODE FOR A RECHARGEABLE ELECTROCHEMICAL CELL

The present invention concerns an electrode for a rechargeable lithium cell, and more particularly the electrochemically active material which it contains.

Lithiated oxides of transition metals with general formula $Li_xM_yO_t$ are known for use as the active material in lithium cells, but their performance still needs to be improved. More particularly, attention must be paid to improving the stability of the cycling capacity of those materials while retaining high initial capacity.

In order to stabilize the cycling capacity of the electrode, U.S. Pat. No. 4,668,595 proposes the use of an alkaline oxide of a transition metal containing one of the following elements: Al, In or Sn. Those elements reduce the discharge voltage and as a result they reduce the initial capacity.

In the case of a lithiated nickel oxide, other authors have partially substituted the nickel with an element such as Ti, V, Mn, or Fe (European patent EP-A-0 554 906) or Co or Cr (EP-A-0 468 942 and EP-A-0 554 649). The capacity of those materials diminishes rapidly during cycling.

European patent application EP-A-0 630 064 proposes a lithiated oxide with general formula $Li_xA_yM_zJ_mO_p$ where A is Na and/or K, M is Ni, Co, and/or Mn, and J is B, Si, Ge, P, V, Zr, Sb, or Ti.

The improvements obtained with those materials pertain only to only one aspect of their performance, to the detriment of others.

The aim of the present invention is to provide an electrochemically active material with an initial capacity per unit mass which is high and stable during cycling, particularly at temperatures above ambient temperature.

The present invention provides an electrode for a rechargeable lithium cell, containing an electro-chemically chemically active material with general formula $$Li_xM_yA_mD_zO_t$$

where:

$0.8 \leq x \leq 1.2 \quad 0 \leq z \leq 0.3 \quad 1.8 \leq t \leq 4.2$ $(0.8-m-z) \leq y \leq (2.2-m-z) \quad 0 < m \leq 0.3$ where M is at least one transition metal selected from nickel, cobalt, manganese, and iron, A is selected from magnesium and calcium, and D is at least one element selected from the elements of groups 4b to 5a of the periodic classification.

In the formula, Li represents lithium and O is oxygen. The term "element from groups 4b to 5a of the periodic classification" (HANDBOOK of CHEMISTRY and PHYSICS, 46$^{the}$ Edition) means the elements from Ti, Zr, etc . . . , to Sb, Bi.

D is preferably at least one metal selected from titanium, zirconium, vanadium, chromium, molybdenum, copper, zinc, cadmium, aluminum, gallium, and tin. Doping elements D substitute for a portion of the transition metal which defines the structure of the material.

Preferably again, M is a mixture of transition metals selected from nickel, cobalt, manganese, and iron, and contains mainly nickel.

In a first embodiment, in the general formula $0.90 \leq x \leq 1.05$.

In a second embodiment, in the general formula $(0.90-m-z) \leq y \leq (1.05-m-z)$.

In a third embodiment, in the general formula $0 \leq z \leq 0.2$.

In a fourth embodiment, in the general formula $0 \leq m \leq 0.2$.

In a fifth embodiment, in the general formula $(m+z) \leq 0.2$.

The present invention also provides a process for the production of an electrochemically active material for use in an electrode of a rechargeable lithium cell. The process comprises the following steps:

forming a mixture comprising at least one lithium compound and at least one oxygen-containing compound of at least one transition metal M and of an element A selected from magnesium and calcium;

grinding the mixture, then heat treating it in an oxidizing atmosphere, for example in air or oxygen.

The lithium compound is preferably selected from lithium hydroxide $LiOH(H_2O)$, lithium carbonate $Li_2CO_3$, lithium nitrate $LiNO_3$, lithium oxide $Li_2O$, and mixtures thereof.

Preferably, said oxygen-containing compound is selected from an oxide, a hydroxide, an oxyhydroxide and mixtures thereof.

In a variation, said oxygen-containing compound further comprises at least one element D selected from elements from groups 4b to 5a of the periodic classification.

In a first implementation, said mixture is approximately equimolar, i.e., the number of moles of lithium $(n_{Li})$, of the transition metal M $(n_M)$, of the element represented by A $(n_A)$, and of the element represented by D $(n_D)$ are linked by the relationship:

$$\frac{n_{Li}}{n_M + n_A + n_D} \approx 1$$

This mixture leads to a structure of the type $Li_xMA_mD_zO_2$, which is derived, for example, from $LiNiO_2$, $LiCoO_2$, $LiFeO_2$, $LiMnO_2$, etc . . . .

In a second implementation, said mixture contains approximately twice as many moles of lithium as oxygen-containing compound, i.e., the number of moles of lithium $(n_{Li})$, transition metal M $(n_M)$, element represented by A $(n_A)$ and element represented by D $(n_D)$ are linked by the relationship:

$$\frac{n_{Li}}{n_M + n_A + n_D} \approx 2$$

This mixture leads to a structure of the type $Li_xM_2A_mD_zO_4$, derived, for example, from $LiNi_2O_4$, $LiCo_2O_4$, $LiMn_2O_4$, etc . . . .

The heat treatment is preferably carried out at a temperature in the range 600° C. to 750° C. for a period in the range 2 hours to 20 hours.

After synthesis, the material can be ground again if necessary to bring it to the desired grain size.

The present invention also provides a rechargeable lithium cell comprising at least one negative electrode, at least one positive electrode and an electrolyte. Said cell comprises an electrode according to the invention and said negative electrode comprises an electro-chemically active material selected from lithium metal, lithium alloys and a material which can reversibly intercalate lithium ions into its structure, such as carbons (graphite, vitreous carbon, coke) in the form of a powder or fibers, or metal oxides.

Preferably, said electrolyte is composed of a lithium salt in solution in a non-aqueous solvent. Said salt is selected from lithium perchlorate $LiClO_4$, lithium hexafluoroarsenate $LiAsF_6$, lithium hexafluorophosphate $LiPF_6$, lithium tetrafluoroborate $LiBF_4$, lithium trifluoromethanesulfonate $LiCF_3SO_3$, lithium trifluoromethanesulfonimide $LiN(CF_3SO_2)_2$ (LiTFSI), or lithium trifluoromethanesulfonemethide $LiC(CF_3SO_2)_3$ (LiTFSM). The solvent is constituted by a mixture of ethers and/or esters. The esters are, for example, selected from linear carbonates and cyclic carbonates containing more than 4 carbon atoms, such as propylene carbonate (PC), ethylene carbonate (EC), butylene carbonate, diethyl carbonate (DEC) or dimethyl carbonate (DMC).

Further characteristics and advantages of the present invention will become apparent from the following examples which are, of course, given by way of illustration and are not limiting, and are made with reference to the single FIGURE which shows the development of the capacity per unit mass C of materials in mAh/g as a function of the number of cycles N.

EXAMPLE 1

A reference material I was prepared from an equimolar mixture of lithium hydroxide $LiOH(H_2O)$ and nickel oxide NiO. The mixture was ground then heat treated at 700° C. in air for 10 hours. After synthesis, the material was ground again to bring it to the desired grain size.

EXAMPLE 2

A reference material II was prepared from an equimolar mixture of lithium hydroxide $LiOH(H_2O)$ and nickel hydroxide $Ni(OH)_2$, prepared (for example) by precipitating a solution of nickel nitrate in a basic medium. The mixture was ground, then heat treated at 750° C. in air for 5 hours. After synthesis, the material was ground again to bring it to the desired grain size.

EXAMPLE 3

Prior art materials were prepared which contained 5 mole % of a doping element and which had general formula:

$$Li_xNi_{0.95}D_{0.05}O_2$$

These materials were produced as described in Example 2, with the exception that the lithium hydroxide was mixed with the compound $Ni_{0.95}D_{0.05}(OH)_2$ which is a mixed hydroxide of nickel and a doping element prepared by precipitating a solution of nitrates of nickel and the doping element in a basic medium.

The prepared IIIa to IIIg materials contained respectively, as doping element D: Al, Sn, Ti, Mn, Fe, Cr, and Ge.

EXAMPLE 4

Comparison materials IVa to IVc were prepared which contained 5 mole % of a doping element D selected respectively from Cd, Zn, and Cu and which had general formula:

$$Li_xNi_{0.95}D_{0.05}O_2$$

These materials were produced as described in Example 2, with the exception that the lithium hydroxide was mixed with the compound $Ni_{0.95}D_{0.05}(OH)_2$ which is a mixed hydroxide of nickel and a doping element prepared by precipitation of a solution of nitrates of nickel and the doping element in a basic medium.

EXAMPLE 5

A material V was prepared which was in accordance with the present invention, containing 5 mole % of magnesium and with general formula:

$$Li_xNi_{0.95}Mg_{0.05}O_2$$

This material was produced as described in Example 2, with the exception that the lithium hydroxide was mixed with the compound $Ni_{0.95}Mg_{0.05}(OH)_2$ which is a nickel hydroxide $Ni(OH)_2$ substituted with 5 mole % of magnesium Mg, obtained by precipitating a solution of nitrates of nickel and magnesium in a basic medium.

EXAMPLE 6

A material VI was prepared which was in accordance with the present invention, containing 5 mole % of magnesium and 5 mole % of titanium, with general formula:

$$Li_xNi_{0.95}Mg_{0.05}Ti_{0.05}O_2$$

This material was produced as described in Example 2, with the exception that the lithium hydroxide was mixed with the compound $Ni_{0.90}Mg_{0.05}Ti_{0.05}(OH)_2$ which is a nickel hydroxide $Ni(OH)_2$ substituted with 5 mole % of magnesium Mg and 5 mole % of titanium Ti, obtained by precipitating a solution of nitrates of nickel and magnesium with an oxygen-containing titanium compound in a basic medium.

EXAMPLE 7

A material VII was prepared which was in accordance with the present invention, containing 5 mole % of magnesium and 5 mole % of tin, with general formula:

$$Li_xNi_{0.90}Mg_{0.05}Sn_{0.05}O_2$$

These materials were produced as described in Example 2, with the exception that the lithium hydroxide was mixed with the compound $Ni_{0.90}Mg_{0.05}Sn_{0.05}(OH)_2$ which is a nickel hydroxide $Ni(OH)_2$ substituted with 5 mole % of magnesium Mg and 5 mole % of tin Sn, obtained by precipitating a solution of nitrates of nickel and magnesium with an oxygen-containing tin compound in a basic medium.

EXAMPLE 8

The effects of dopants on the capacity per unit mass of the materials was studied. To this end, electrodes were prepared which respectively contained the materials prepared above, powdered carbon, and a polymer binder to ensure the mechanical strength of the electrode.

Each electrode was placed in a button type cell. The electrolyte was a mixture of propylene carbonate, ethylene carbonate, and dimethyl carbonate PC/EC/DMC in proportions of 1/1/3 by volume, and contained 1M lithium hexafluorophosphate $LiPF_6$. The counter-electrode was lithium metal.

A first cycle was carried out between 3 volts and 4.1 volts with a specific current of 7 mA/g, at ambient temperature (25° C.). The charged capacity $C_c$ during the first charge was measured and the reversibly discharged capacity $C_d$ on the first discharge was measured. The ratio R was calculated using the formula:

$$R\ (\%) = \frac{C_c}{C_c} \times 100$$

to determine the yield R. The results are shown in Table I below.

TABLE I

| Ref. | A | D | mAh/g $C_c$ | $C_d$ | R % |
|---|---|---|---|---|---|
| I | — | — | 180 | 145 | 81 |
| II | — | — | 183 | 159 | 87 |
| IIIa | — | Al | 169 | 122 | 72 |
| IIIb | — | Sn | 174 | 154 | 89 |
| IIIc | — | Ti | 184 | 166 | 90 |
| IIId | — | Mn | 174 | 133 | 76 |
| IIIe | — | Fe | 170 | 128 | 75 |
| IIIf | — | Cr | 166 | 122 | 73 |
| IIIg | — | Ge | 158 | 105 | 66 |
| IVa | — | Cd | 179 | 153 | 85 |
| IVb | — | Zn | 181 | 152 | 84 |
| V | Mg | — | 180 | 152 | 84 |
| VI | Mg | Ti | 178 | 166 | 93 |
| VII | Mg | Sn | 180 | 154 | 86 |

Reference materials I and II prepared using different processes produced results which were comparable and at the same level as the best materials of that type described in the literature. The reversible cycling capacity represented more than 80% of the capacity of the first charge.

The prior art materials had a reversible cycling capacity during the first cycle which was lower than that of the reference materials (145 mAh/g), with the exception of the IIIb and IIIc materials: 154 mAh/g and 166 mAh/g.

Of the prior art IIIa to IIIg materials, only the IIIb and IIIc materials had a yield of over 80%.

The comparison materials produced results which were at least equal to those of the reference materials.

EXAMPLE 9

The effect of dopants on the stability of the cycling capacity of the materials on cycling was studied. To this end, electrodes were produced as described in Example 8. Each electrode was placed in a button type cell as described in Example 8. The loose fit of the electrode in these cells rendered this test particularly selective by accelerating the onset of reduced performance during cycling.

Cycling was carried out under conditions which were analogous to those given in Example 8, with the exception that it was carried out at a temperature of 60° C. to accelerate ageing. The discharged capacity $C_1$ for the first cycle was measured and the discharged capacity $C_{25}$ after 25 cycles was measured. The loss of capacity was then calculated using the formula:

$$P\ (\%) = \frac{C_1 - C_{25}}{C_1} \times 100$$

The results are shown in Table II below.

TABLE II

| Ref. | A | D | mAh/g $C_1$ | $C_{25}$ | P % | Ref. FIG. |
|---|---|---|---|---|---|---|
| I | — | — | 155 | 100 | 35 | — |
| II | — | — | 150 | 105 | 30 | 1 |
| IIIb | — | Sn | 163 | 127 | 22 | — |
| IIIc | — | Ti | 165 | 125 | 24 | 2 |
| IVa | — | Cd | 169 | 131 | 22 | 3 |
| IVb | — | Zn | 162 | 107 | 34 | 4 |
| IVc | — | Cu | 172 | 133 | 23 | 5 |
| V | Mg | — | 165 | 148 | 10 | — |
| VI | Mg | Ti | 165 | 156 | 5 | 6 |
| VII | Mg | Sn | 165 | 157 | 5 | — |

It can be seen that addition of a dopant such as Sn, Ti, Cu, or Cd reduced the loss of capacity to values in the range 20% to 25% compared with reference materials I and II which were not doped, for which the loss of capacity was of the order of 30–35%.

Materials v, vi and vii of the invention had a loss of capacity of less than 10%.

What is claimed is:

1. An electrode for a rechargeable lithium cell, containing an electrochemically active material with formula:

$$Li_x(M_yA_mD_z)O_4$$

where:

$0.8 \leq x \leq 1.2$ $0 \leq z \leq 0.3$ $y = 2.2 - m - z$ $0 < m \leq 0.3$ where M is at least one transition metal selected from nickel, cobalt, manganese, and iron, A is selected from magnesium and calcium, and D is at least one element selected from Ti, Zr, Hf; V, Nb, Ta; Cr, Mo, W; Mn, Tc, Re; Fe, Ru, Os, Co, Rh, Ir, Ni, Pd, Pt; Cu, Au, Ag; Zn, Cd, Hg; B, Al, Ga, In, Tl; C, Si, Ge, Sn, Pb; N, P, As, Sb and Bi.

2. An electrode according to claim 1, in which D is at least one metal selected from titanium, zirconium, vanadium, chromium, molybdenum, copper, zinc, cadmium, aluminum, gallium, and tin.

3. An electrode according to claim 1, in which M is a mixture of transition metals selected from nickel, cobalt, manganese, and iron, and contains mainly nickel.

4. An electrode according to claim 1, in which $0.90 \leq x \leq 1.05$.

5. An electrode according to claim 1, in which $0 \leq z \leq 0.2$.

6. An electrode according to claim 1, in which $0 \leq m \leq 0.2$.

7. An electrode according to claim 1, in which $(m+z) \leq 0.2$.

8. A process for production of an electrode comprising the following steps:
(a) forming a mixture comprising
(i) at least one lithium compound selected from the group consisting of lithium hydroxide, lithium carbonate, lithium nitrate, lithium oxide and mixtures thereof, and
(ii) at least one oxygen-containing compound of at least one transition metal M and an element A selected from magnesium and calcium, and optionally an element D from groups 4b to 5a of the periodic classification;

wherein the mixture has $n_{Li}/n_M + n_A + n_D$ approximately equal to 2, wherein $n_{Li}$ is number of moles of lithium, $n_M$ is the number of moles of M, $n_A$ is the number of moles of A and $n_D$ is the number of moles of D;

(b) grinding the mixture of step (a), then (c) heat treating the ground mixture in an oxidizing atmosphere, at a temperature of 600° C. to 750° C. for 2–20 hours and (d) optionally re-grinding the heat-treated ground mixture to provide a desired grain size.

9. A process to claim 8, in which said oxygen-containing compound is selected from an oxide, a hydroxide, an oxyhydroxide and mixtures thereof.

10. A process according to claim 8, in which said oxygen-containing compound further comprises at least one element selected from elements from groups 4b to 5a of the periodic classification.

11. A rechargeable lithium cell comprising at least one negative electrode, at least one positive electrode and an electrolyte, and comprising an electrode according to claim 1, in which said negative electrode comprises an electrochemically active material selected from lithium metal, lithium alloys and a material which can reversibly intercalate lithium ions into its structure.

12. A cell according to claim 11, in which said electrolyte is composed of a lithium salt in solution in a non-aqueous solvent, said salt being selected from lithium percholorate, lithium hexafluoroarsenate, lithium hexafluorophosphate, lithium tetrafluoroborate, lithium trifluoromethanesulfonate, lithium trifuloromethane-sulfonimide, and lithium trifluoromethanesulfonemethide, and said solvent is constituted by a mixture of ethers and/or esters.

13. An electrode for a rechargeable lithium cell, containing an electrochemically active material with formula:

$$Li_x(Co_yA_mD_z)O_t$$

where:

$0.8 \leq x \leq 1.2$ $0 \leq z \leq 0.3$ $1.8 \leq t \leq 4.2$ $(0.8 - m - z) \leq y \leq (2.2 - m - z)$ $0 < m \leq 0.3$ where A is selected from magnesium and calcium, and D is at least one element selected from Ti, Zr, Hf; V, Nb, Ta; Cr, Mo, W; Mn, Tc, Re; Fe, Ru, Os, Co, Rh, Ir, Ni, Pd, Pt; Cu, Au, Ag; Zn, Cd, Hg; B, Al, Ga, In, Tl; C, Si, Ge, Sn, Pb; N, P, As, Sb and Bi.

14. An electrode for a rechargeable lithium cell, containing an electrochemically active material with formula:

$$Li_x(Fe_yA_mD_z)O_t$$

where:

$0.8 \leq x \leq 1.2$ $0 \leq z \leq 0.3$

-continued $1.8 \leq t \leq 4.2$ $(0.8 - m - z) \leq y \leq (2.2 - m - z)$ $0 < m \leq 0.3$ A is selected from magnesium and calcium, and D is at least one element selected from Ti, Zr, Hf; V, Nb, Ta; Cr, Mo, W; Mn, Tc, Re; Fe, Ru, Os, Co, Rh, Ir, Ni, Pd, Pt; Cu, Au, Ag; Zn, Cd, Hg; B, Al, Ga, In, Tl; C, Si, Ge, Sn, Pb; N, P, As, Sb and Bi.

15. An electrode for a rechargeable lithium cell, containing an electrochemically active material with formula:

$$Li_x(Mn_yA_mD_z)O_t$$

where:

$0.8 \leq x \leq 1.2$ $0 \leq z \leq 0.3$ $1.8 \leq t \leq 4.2$ $(0.8 - m - z) \leq y \leq (2.2 - m - z)$ $0 < m \leq 0.3$ A is selected from magnesium and calcium, and D is at least one element selected from Ti, Zr, Hf; V, Nb, Ta; Cr, Mo, W; Mn, Tc, Re; Fe, Ru, Os, Co, Rh, Ir, Ni, Pd, Pt; Cu, Au, Ag; Zn, Cd, Hg; B, Al, Ga, In, Tl; C, Si, Ge, Sn, Pb; N, P, As, Sb and Bi.

16. An electrode for a rechargeable lithium cell, containing an electrochemically active material with formula:

$$Li_x(Ni_yA_mD_z)O_t$$

where:

$0.8 \leq x \leq 1.2$ $0 \leq z \leq 0.3$ $1.8 \leq t \leq 4.2$ $(0.8 - m - z) \leq y \leq (2.2 - m - z)$ $0 < m \leq 0.3$ A is selected from magnesium and calcium, and D is at least one element selected from Zn, Cd, Hg; B, Al, Ga, In, Tl; C, Si, Ge, Sn, Pb; N, P, As, Sb and Bi.

17. An electrode according to claim 16, with active material with formula $Li_x(Ni_yMg_mSn_z)O_t$.

18. An electrode according to claim 17, with active material with formula:

$$Li_x(Ni_{0.90}Mg_{0.05}Sn_{0.05})O_2.$$

19. An electrode for a rechargeable lithium cell, containing an electrochemically active material with formula:

$$Li_x(Ni_yA_m)O_t \text{ where:}$$

$0.8 \leq x \leq 1.2$ $1.8 \leq t \leq 4.2$

-continued $$(0.8 - m) \leq y \leq (2.2 - m)$$

$$0 < m \leq 0.3$$

and where

A is selected from magnesium and calcium.

20. An electrode according to claim 19, with active material with formula: $Li_x(Ni_yMg_m)O_t$.

21. An electrode according to claim 20, with active material with formula: $Li_x(Ni_{0.95}Mg_{0.05})O_2$.

22. An electrode for a rechargeable lithium cell, containing an electrochemically active material with formula:

$$Li_x(Ni_y Mg_m Ti_z)O_t$$

where:

$$0.90 \leq x \leq 1.05$$

$$0 \leq z \leq 0.2$$

$$1.8 \leq t \leq 4.2$$

$$(0.90 - m - z) \leq y \leq (1.05 - m - z)$$

$$0 < m \leq 0.2$$

$$(m + z) \leq 0.2$$

23. An electrode according to claim 22, wherein the active material is of formula $Li_x(Ni_{0.90}Mg_{0.05}Ti_{0.05})O_2$.

24. A process for production of an electrode comprising the following steps:
    (a) forming a mixture comprising
        (i) at least one lithium compound selected from the group consisting of lithium hydroxide, lithium carbonate, lithium nitrate, lithium oxide and mixtures thereof, and
        (ii) at least one oxygen-containing compound of at least one transition metal M and an element A selected from magnesium and calcium, and optionally an element D from groups 4b to 5a of the periodic classification
    wherein the mixture has $n_{LI}/n_M+n_A+n_D$ approximately equal to 1, wherein $n_{LI}$ is number of moles of lithium, $n_M$ is the number of moles of M, $n_A$ is the number of moles of A and $n_D$ is the number of moles of D;
    (b) grinding the mixture of step (a), then
    (c) heat treating the ground mixture in an oxidizing atmosphere, at a temperature of 600° C. to 750° C. for 2–20 hours and
    (d) optionally re-grinding the heat-treated ground mixture to provide a desired grain size.

25. A method of improving stability of cycling capacity of active materials in lithium cells, while retaining high initial capacity, consisting essentially of selecting an active material according to formula $Li_xM_yA_mD_zO_t$ where:

$$0.8 \leq x \leq 1.2$$

$$0 \leq z \leq 0.3$$

$$1.8 \leq t \leq 4.2$$

$$(0.8 - m - z) \leq y \leq (2.2 - m - z)$$

$$0 < m \leq 0.3$$

where

M is at least one transition metal selected from nickel, cobalt, manganese, and iron, A is selected from magnesium and calcium, and D is at least one element selected from Ti, Zr, Hf; V, Nb, Ta; Cr, Mo, W; Mn, Tc, Re; Fe, Ru, Os, Co, Rh, Ir, Ni, Pd, Pt; Cu, Au, Ag; Zn, Cd, Hg; B, Al, Ga, In, Tl; C, Si, Ge, Sn, Pb; N. P. As, Sb and Bi.

* * * * *